US008185297B2

(12) United States Patent
MacLeod (10) Patent No.: US 8,185,297 B2
(45) Date of Patent: May 22, 2012

(54) PERSONALIZED TRAFFIC REPORTS

(75) Inventor: John MacLeod, Kenilworth, IL (US)

(73) Assignee: Navteq NA LLC, Chicago, IL (US)

( * ) Notice: Subject to any disclaimer, the term of this patent is extended or adjusted under 35 U.S.C. 154(b) by 687 days.

(21) Appl. No.: 12/287,958

(22) Filed: Oct. 15, 2008

(65) Prior Publication Data

US 2010/0094531 A1    Apr. 15, 2010

(51) Int. Cl.
*G06F 17/20* (2006.01)
*G06G 7/76* (2006.01)
*G06G 7/78* (2006.01)

(52) U.S. Cl. ...................................... 701/119
(58) Field of Classification Search ............. 701/119, 701/117, 118, 211, 212; 343/62, 66, 69, 343/150, 153, 243, 305; 348/113, 119; 40/455, 40/457
See application file for complete search history.

(56) References Cited

U.S. PATENT DOCUMENTS

| | | | |
|---|---|---|---|
| 6,845,316 B2 * | 1/2005 | Yates | 701/117 |
| 7,274,311 B1 * | 9/2007 | MacLeod | 340/995.13 |
| 7,603,621 B2 * | 10/2009 | Toyama et al. | 715/707 |
| 2006/0139354 A1 * | 6/2006 | Suma | 345/473 |
| 2009/0216433 A1 * | 8/2009 | Griesmer et al. | 701/208 |

FOREIGN PATENT DOCUMENTS

| | | |
|---|---|---|
| DE | 102007044812 | 5/2008 |
| DE | 10123345 | 11/2008 |
| EP | 1376059 | 1/2004 |

OTHER PUBLICATIONS

EPA 09252254.9 European Search Report, dated Feb. 4, 2010.

* cited by examiner

*Primary Examiner* — Mark Beauchaine
(74) *Attorney, Agent, or Firm* — Adil M. Musabji; Frank J. Kozak; Jon D. Shutter (57) ABSTRACT

A method and system are disclosed for providing personalized traffic reports. A personalized traffic report is a relatively short, audio-visual presentation that includes an audio narrative by an announcer describing the traffic conditions along a user's selected route, synchronized with a video presentation that includes maps with animations showing the traffic conditions and a visual representation of the announcer. A traffic data services provider determines traffic conditions that pertain to a user's identified particular route, i.e. from an origin to a destination. Then, the traffic data services provider forms an audio-video file that includes an audio narrative in the voice of an announcer that describes the traffic conditions along the user's route, along with a visual map representation of the user's route, a graphical indication of the traffic conditions along the route, and a visual representation of the announcer. The traffic data services provider transmits the audio-video file of the personalized traffic report to the user, who then plays it back on a computing device.

30 Claims, 7 Drawing Sheets

PERSONALIZED TRAFFIC REPORTS

BACKGROUND OF THE INVENTION

The present invention relates to providing traffic information to users.

Traffic information is available to vehicle drivers, travelers, commuters, pedestrians, as well as others, from a variety of sources. For example, drivers and others can obtain traffic information from radio or television broadcasts. These sources may have timely, detailed and rich information. These sources may also be presented using narrative explanations provided by professional announcers that add clarity. However, radio and television traffic broadcasts are intended for general audiences and may not be relevant to the user's specific location or route. Moreover, users may have to wait through a long broadcast traffic report while traffic information is provided about areas that are not relevant to the user's travel plans.

Traffic information is also available from various web sites. Traffic information web sites allow users to find traffic information that is relevant to their own particular travel routes and plans. However, users do not always have access to the web sites. Further, when users access web sites with mobile devices, such as smart phones, the information may be presented in only a limited fashion, with brief video or audio descriptions of the traffic conditions on specific portions of roads.

Although these various ways of indicating traffic conditions along roads are useful, there exists room for improvements. Accordingly, there is a need for further ways to indicate traffic conditions to a user.

SUMMARY OF THE INVENTION

To address these and other objectives, the present invention includes a method for providing personalized traffic reports. A personalized traffic report is a relatively short, audio-visual presentation that includes an audio narrative by an announcer describing the traffic conditions along a user's selected route, synchronized with a video presentation that includes maps with animations showing the traffic conditions and a visual representation of the announcer. In one embodiment, a traffic data services provider determines traffic conditions that pertain to a user's particular route, i.e. from an origin to a destination. Then, the traffic data services provider forms an audio-video file that combines an audio narrative in the voice of an announcer that describes the traffic conditions along the user's route, along with a visual map representation of the user's route, a graphical indication of the traffic conditions along the route, and a visual representation of the announcer. The traffic data services provider transmits the audio-video file of the personalized traffic report to the user, who then plays it back on a computing device.

DETAILED DESCRIPTION OF THE PRESENTLY PREFERRED EMBODIMENTS

I. First Embodiment

Figure 1:
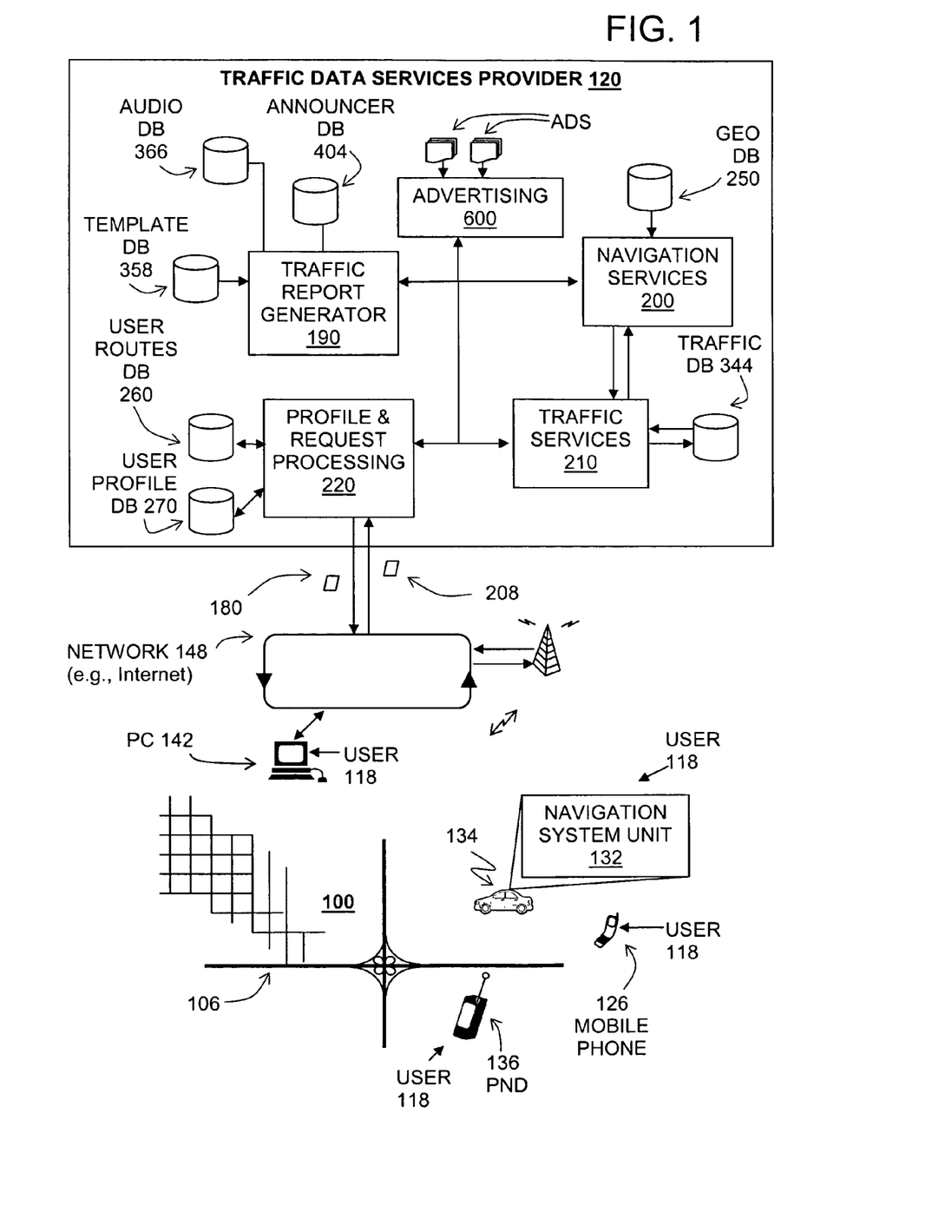
FIG. 1 is a diagram showing a system for providing personalized traffic reports to users throughout a geographic area.

FIG. 1 is a diagram of system for providing personalized traffic reports to users. FIG. 1 shows a geographic region 100. The geographic region 100 may correspond to a metropolitan area, a state, a province or a country or combinations of portions thereof. A road network 106 is located in the geographic area 100.

Users 118 operate various computer platforms to access a traffic data services provider 120. The various computer platforms may include mobile phones 126, vehicle navigation systems 132 (located in vehicles 134) with wireless network access, personal navigation devices ("PNDs") 136, or personal computers ("PC") 142. The various computer platforms may include other types of devices. The various computer platforms may be located in the geographic area 100 or may be located elsewhere. The various computer platforms have the appropriate hardware and software to send and receive data. The various computer platforms use one or more data networks 148, such as the Internet or the phone system, some of which may include wireless portions.

The traffic data services provider 120 provides various traffic-related services that pertain to the road network 106 located in the geographic region 100. The traffic data services provider 120 may be located in the geographic region 100 or may be located elsewhere. The traffic data services provider 120 includes operations that collect traffic information about the road network 106, verify collected traffic information, organize traffic information and deliver traffic information to various users. The traffic data services provider 120 may provide traffic information about all the roads in the geographic area 100 or alternatively may provide information about only a portion of all the roads, such as only high volume roads or expressways. The traffic data services provider 120 includes hardware, software, and data suitable for performing these functions. The traffic data services provider 120 includes appropriate hardware, software and data for communicating with various users 118 over the data network 148.

Included among the products and/or services provided by the traffic data services provider 120 are personalized traffic reports. A personalized traffic report is a relatively short (15 seconds to 1 minute) audio-visual presentation that includes an audio narrative by an announcer describing the traffic conditions along a user's selected route, synchronized with a video presentation that includes maps with animations showing the traffic conditions and a visual representation of the announcer.

In order to provide personalized traffic reports, the traffic data services provider 120 includes a traffic report generator 190. The traffic report generator 190 is a software application that is run on one or more servers operated by the traffic data services provider 120. The traffic report generator 190 communicates and exchanges data with a navigation services application 200, a traffic services application 210, and a request processing application 220. The navigation services application 200, the traffic services application 210, and the request processing application 220 are software programs run on one or more servers of the traffic data services provider 120.

Operation of the traffic data services provider 120 to provide personalized traffic reports 180 is described in connection with FIGS. 2, 3A and 3B.

Figure 2:
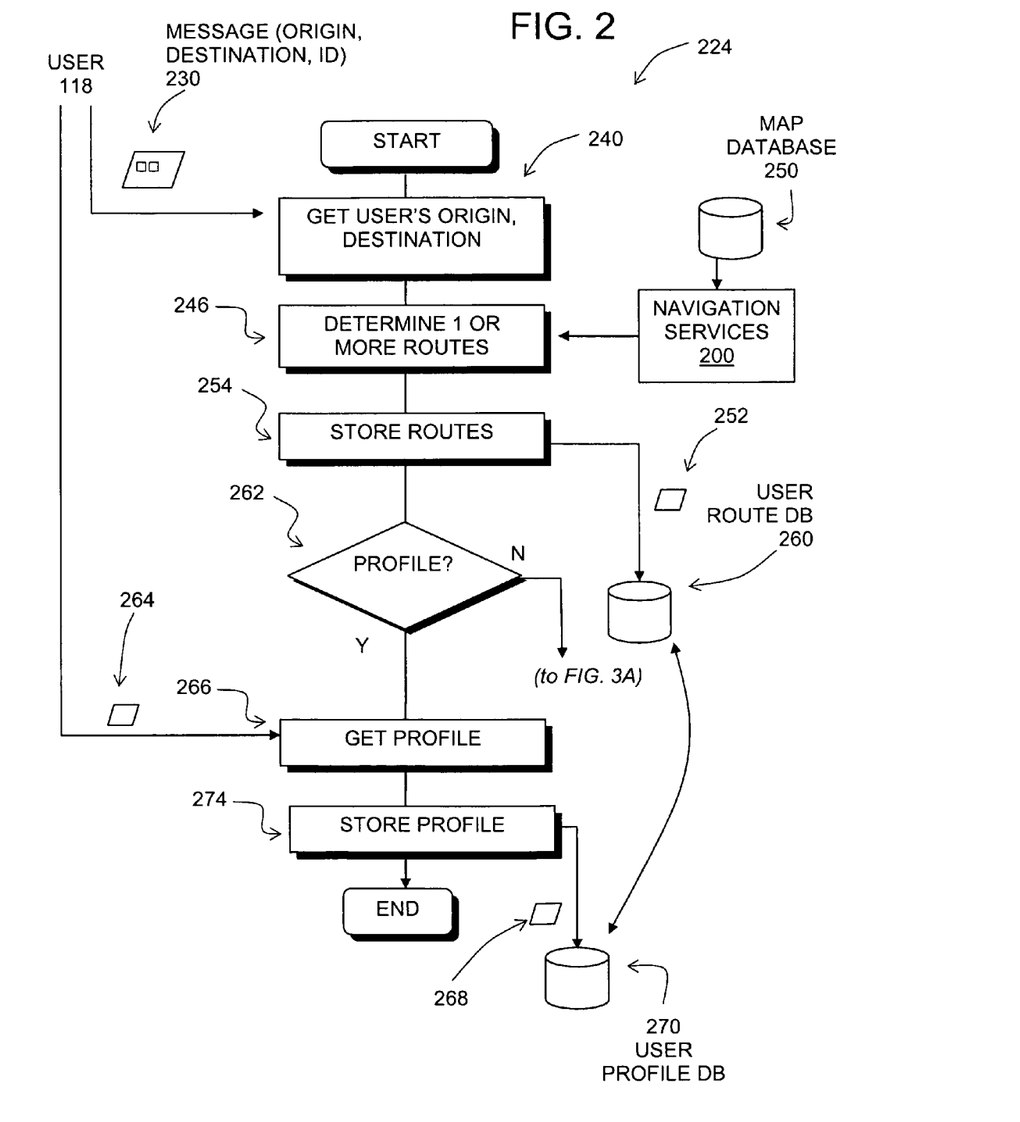
FIG. 2 is a flowchart that shows a process whereby users can indicate and store route information with the traffic data services provider shown in FIG. 1.

FIG. 2 is a flowchart that shows a process 224 whereby users can indicate and/or store route information with the traffic data services provider 120. The route information defines one or more routes about which the user wishes to obtain traffic reports on a regular or a one-time basis. The process 224 in FIG. 2 may be performed in whole or in part by the profile and request processing application (220 in FIG. 1) or may be performed by another application.

In FIG. 2, a user 118 operates a computer platform, such as his/her mobile phone (126 in FIG. 1), to communicate over the data network 148 with the traffic data services provider 120. More specifically, the user 118 sends a message 230 to the traffic data services provider 120. The message 230 identifies an origin and a destination. The user 118 may use the user interface (e.g., keypad, microphone, etc.) of the computing platform to specify this information. Alternatively, an origin may be provided by position determining equipment, such as a GPS unit, associated with the user's computing platform. The message 230 may also include information that identifies the user. The identifying information may include the user's name, but alternatively the identifying information may include an alphanumeric ID, an email address, an alias, an account number or other information.

The traffic data services provider 120 receives the message 230 (Step 240). The traffic data services provider 120 then determines one or more routes between the user's origin and destination (Step 246). The traffic data services provider 120 may access the navigation services application 200 for this purpose. The navigation services application 200 in turn may use a geographic map database 250. The geographic map database 250 includes data about the roads in the road network (106 in FIG. 1), including information about the positions of the roads, speed limits along the roads, names of roads, address ranges, number of lanes, points of interest, and so on. If possible, the navigation services application 200 attempts to find several different routes that use different combinations of roads between the origin and destination.

After the navigation services application 200 determines one or more routes, the traffic data services provider 120 stores data 252 that indicates the one or more calculated routes along with data that identifies the user (Step 254). The data indicating the user's routes and the identifying information are stored in a user routes database 260.

In one embodiment, the process 224 includes the option of allowing the user to store profile information in order to get personalized reports about the traffic conditions between the origin and destination automatically delivered at specified times (Step 262). The process 224 may send the user 118 a message inquiring whether the user wants automatic reports and then obtains the user's response to the inquiry.

If the user 118 chooses not to receive automatic reports, the process 224 proceeds to create and deliver a personalized traffic report for the routes between the user-specified origin and destination, as described in connection with FIGS. 3A and 3B, below (Step 262).

Alternatively, if the user 118 chooses to receive automatic reports, the process 224 then includes the step of obtaining profile information 264 from the user 118 (Steps 262 and 266). According to this embodiment, a user may indicate preferences for automatically receiving personalized traffic reports. For example, the user may want to receive personalized traffic reports at a specific time of day and/or day of week. As an example, a user may want to receive personalized traffic reports at 6:30 AM weekdays, 4:45 PM weekdays, noon on Saturdays, etc. The user may also indicate a preference for where the personalized traffic reports are to be sent. For example, the user may indicate a phone number or email address. The user may also select an announcer to deliver the report. Selection of an announcer is described in more detail below.

The user's preference information is obtained by the traffic data services provider 120 and stored as profile data 268 in a users profile database 270 (Step 274). The user's profile information in the user profile database 270 is associated with the user's routes that had been stored in the user route database 260, by indexing, pointers or other means. Then, the process 224 ends.

Figure 3A:
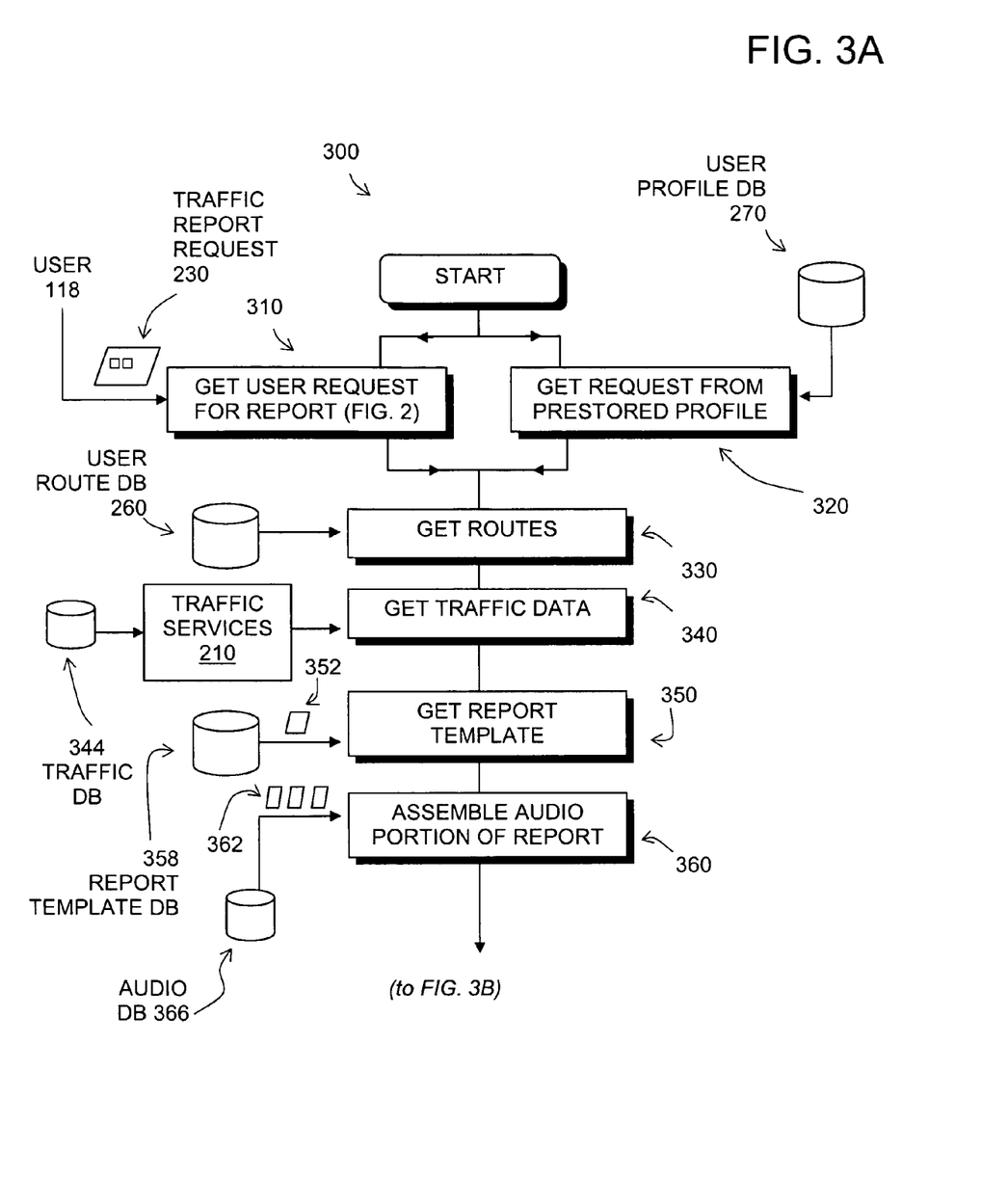
FIG. 3A and FIG. 3B show a flowchart of a process illustrates how the traffic data services provide in FIG. 1 forms and delivers a personalized traffic report to a user.
Figure 3B:
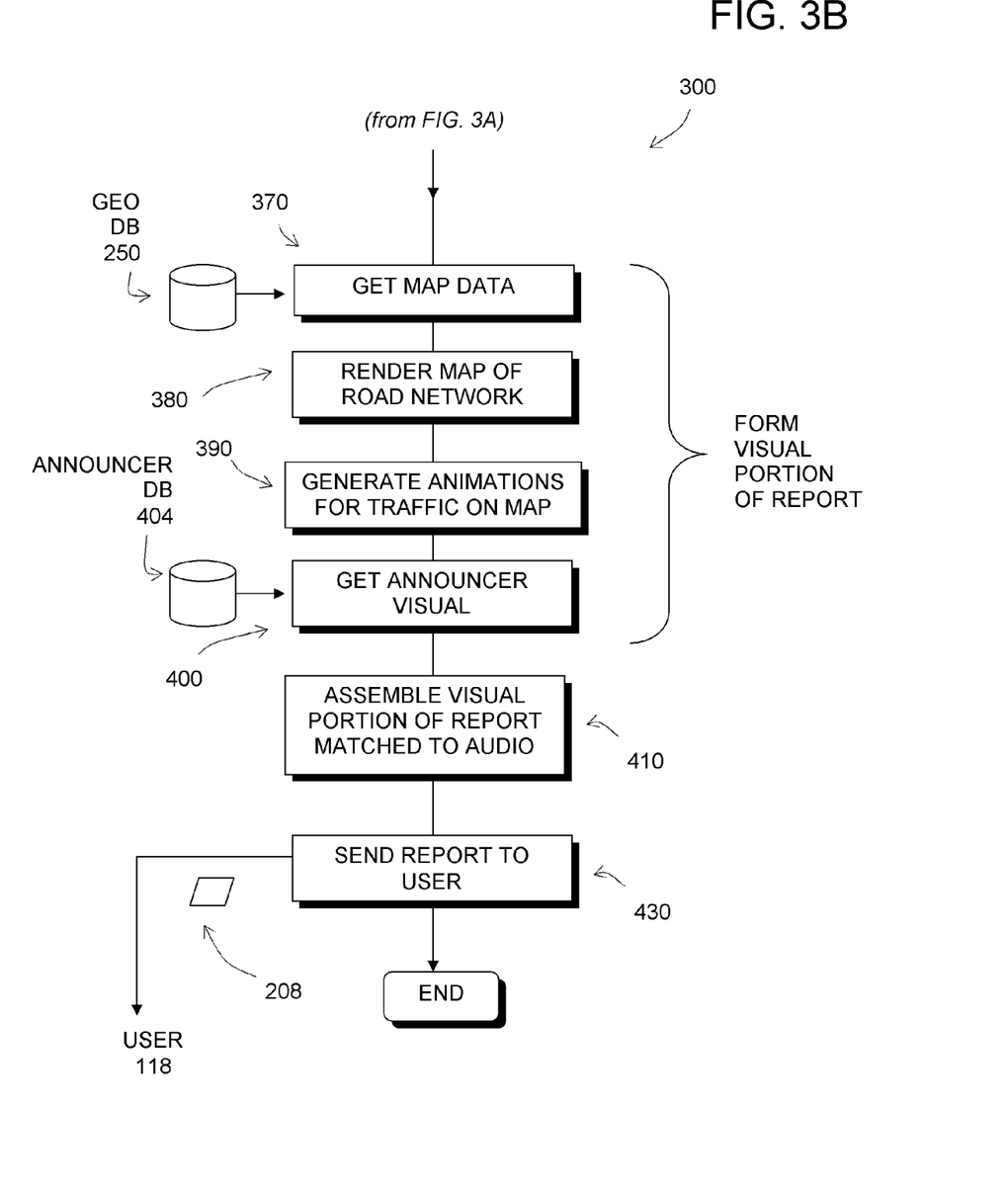

FIGS. 3A and 3B show a process 300 for creating and delivering personalized traffic reports.

The process 300 includes at least two different ways to get started. One way (Step 310) is to prepare a personalized traffic report for a user in response to a single request. This way is essentially the process 224 of FIG. 2, in which the user chooses not to store a profile (in Step 262). Another way that the process 300 can start is to obtain a request generated from a user's stored profile (Step 320). An application (which may be part of the profile and request processing application 220 in FIG. 1) automatically generates requests for reports based on the information in the users' stored profiles in the user profile database 270. As mentioned above, the user may store profile information that indicates that a personalized traffic report is desired at a pre-set time and day.

Regardless of the way that the user's request for a personalized traffic report is started, the process 300 next obtains information from the user route database 260 that identifies the one or more routes associated with the user request (Step 330).

Next, the process 300 obtains the traffic data that pertinent to the user's stored routes (Step 340). The pertinent traffic data may be obtained from the traffic services application 210. The traffic services application 210 may access a traffic information database 344. The traffic information database 344 is continuously updated with traffic flow and incident data that pertains to the road network (106 in FIG. 1).

The process 300 then begins to assemble the personalized traffic report. The process 300 selects a report template 352 (Step 350). The report template may be selected from a report template database 358. The report template 352 may be selected based on several factors, such as the kind of routes associated with the user and how much traffic congestion there is to report. The report template defines how to assemble the personalized traffic report. For example, the report template defines the sequence, timing, duration, components and content of the audio and visual portions of the report. The report template may also indicate the scenes to use for the visual portions of the report. For example, the report template may indicate which scale of map to use for each scene, which portion of the route to be depicted in each scene, whether to use a static map or a "fly-though," whether to show a visual representation of the announcer in the scene, and so on. The report template is designed so that the entire report is relatively short, e.g., 15 seconds to a minute. However, the report template is also flexible so that additional time may be used, if needed, to report on traffic conditions that are more complicated or for routes that are relatively longer.

The process 300 uses the report template 352 to assemble the personalized traffic report. In one embodiment, the process 300 first assembles the audio portion of the report (Step 360). Using the traffic information that is pertinent to the user's route, the process 300 selects appropriate audio clips 362 that describe in narrative the traffic conditions along the user's selected route. The audio clips 362 are obtained from an audio clip database 366 or other data storage device.

In one embodiment, the audio clips are pre-recorded audio files containing spoken words, phrases or phonemes each of which can be used as a component fragment of an entire traffic report. The audio clips may include words, phrases or phonemes of the names of all the roads in the road network (106 in FIG. 1). The audio clips may also include words, phrases or phonemes for all the different types of traffic conditions, such as "SLOW," "55 MILES PER HOUR," "BOTTLENECK," "ACCIDENT OFF TO THE SIDE," "JACKNIFED SEMI," "SPILL," and so on. In addition, the audio clips may include words, phrases or phonemes for forming complete meaningful sentences for forming a traffic report, including articles, prepositions, verbs, etc.

In forming the narrative portion of the traffic report, the audio clips are assembled in a way that describes the traffic conditions along the route in sequence based on travel along the route. That is, a first part of the narrative describes the traffic conditions for the first part of the route, followed by a second part of the narrative that describes the traffic conditions along the next part of the route, and so on, until all the traffic conditions along the entire route are described. An exception to this approach may be used when a particularly unusual or important traffic condition exists along the route. In this case, the traffic report may "lead off" with a description of the unusual or important traffic condition. Another exception may exist when an unusual or important traffic condition causes the traffic services provider to recommend a different route than a user's regular route. When this happens, the traffic report narrative may start with an announcement that the traffic report is recommending a different route because of the unusual or important traffic condition on the user's original or regular route.

The audio clips are spoken in the voice of an announcer. For example, the audio clips may be in the voice of a professional announcer (or talent), such as an announcer from a television or radio station. According to another alternative, the audio clips may be in the voice of a celebrity announcer. In one embodiment, the audio clip database 366 includes audio clips in the voices of several or many different announcers.

As mentioned above, the user 118 may choose certain preferences for how the traffic report is presented (Step 266 in FIG. 2). Among the preferences that the user 118 can select is the announcer who narrates and presents the traffic report. When the user 118 chooses an announcer, audio clips in the voice of the selected announcer are obtained from the audio clip database 366 (in Step 360 in FIG. 3A).

Referring to FIG. 3B, the process 300 next performs a series of steps that form the video portion of the personalized traffic report. In FIG. 3B, the process 300 includes a step that obtains map data that depicts that the user's route (Step 370). The map data is obtained from the geographic database 250. The map data may include data that represents the roads in the user's route as well as roads and other geographic features along the route, (i.e., on either side of the route such as a route corridor).

Next, the process 300 uses the map data to generate scenes, i.e., images and/or video, that depict the user's route (Step 380). The user's route is depicted by showing a map image of the road network around the route and highlighting or otherwise indicating the user's route through the road network. This may be done by highlighting those road segments that make up the user's route so that they stand out against the rest of the roads that make up the road network.

The map data can be used to generate 2D and 3D (or perspective) map images depicting the user's route. The 3D map images may include elevation as well as 3D images of buildings or other features.

The map data may represent the route in one or more scales. The map data may be used to depict the route in one or more static images. For example, the map data may depict the route in an image that shows the entire route. Alternatively, the map data may be used to depict the route in a series of images each of which depicts a portion of the entire route. Alternatively, the map data may be used to depict the route both in a single image that depicts the entire route as well as a series of images each of which depicts a portion of the route.

In addition to representing the route as one or more static images, the map data may be used to depict the route as a "fly-through" video. In a fly-through video, the map data is used to generate a view of the route as if it were being viewed from a helicopter or airplane flying above (several hundred yards, for example) and along the route. A method of rendering a fly-through representation of a route is disclosed in U.S. Pub. No. 2006/0253245, the entire disclosure of which is incorporated by reference herein. The fly-through video may show the route in a 2D view, a 3D view, or in a combination of 2D and 3D views.

In another alternative, the map data may be used to depict the route in a "drive-through" video. In a drive-through video, the map data is used to generate a view of the route as if it were being viewed from a driver in vehicle traveling along the route. In another alternative, a drive-through video may be produced using previously obtained street-level video, as disclosed in U.S. Ser. No. 11/796,899, filed Apr. 30, 1997, the entire disclosure of which is incorporated by reference herein.

In another embodiment, static images, fly-though images and drive-through images may be combined and used in different scenes of the traffic report.

The report template 352 (in FIG. 3A) may include information for determining what types of static images (e.g., scale, 2D, 3D) or fly-through or drive-through video, the process 300 may use to render the various scenes of the traffic report.

Next, the process 300 depicts the traffic conditions along the user's route (Step 390). The traffic conditions along the route may be depicted in various different ways. One way to depict the traffic conditions is to use color. For example, slow moving traffic may be depicted using red or yellow linear outlines along the depiction of the route and free-flowing traffic may be depicted using green linear outlines along the depiction of the route. According to another alternative, the traffic conditions along a route may be depicted using animations. The animations may show representations of vehicles or dots or dashes moving along the depiction of the route. The animations may show faster movement for free-flowing traffic and slower movement for slower-moving traffic. Methods for depicting traffic conditions using animations are disclosed in U.S. Pat. No. 7,116,326 and U.S. Pub. No. 2005/0143902, the entire disclosures of which are incorporated by reference herein.

The process 300 next adds video of the announcer (Step 400). The video of the announcer is obtained from an announcer database 404. As mentioned above, the personalized traffic report includes an audio narrative describing the traffic conditions pertaining to the user's route. In this embodiment, the personalized traffic report also includes a visual representation of the announcer. The video representation of the announcer may be obtained from clips of video of the actual announcer. In one embodiment, the video representation is animated, i.e., includes movement. In one embodiment, the video representation includes facial movement, e.g., moving lips, so that the video representation of the announcer can be matched to the audio narrative of the announcer to produce a realistic looking video of the announcer speaking the narrative. The video representation of the announcer may also include blinking eyes, shifting shoulders, hand and arm movements, and turning of the head and torso.

In addition, the visual representation of the announcer may include hand and arm gestures. The hand and arm gestures may be included in one or more video clips of the announcer. In forming the personalized traffic report, the announcer's hand and arm gestures may be coordinated and synchronized with the traffic narrative so that the visual representation of the announcer in the video appears to point to sections of the route being described in the narrative.

Next, the process 300 assembles the visual portion and audio portions of the personalized traffic report (Step 410). The scenes or clips that make up the visual portion are arranged in sequence and duration so that they match the corresponding portion of the audio narrative that describes the traffic conditions along the route. The scenes and sequence may be defined by the report template 352, as described above.

In forming the personalized traffic report, the video representation of the announcer may be overlaid in front of a map image of the route in some of the scenes. This may have an appearance that is similar to a televised traffic report. In order to overlay the visual representation of the announcer over a map image, the prerecorded video of the announcer may have the announcer appearing in front of a green screen background so that the background can be digitally replaced with the map image of the route in the video portion of the personalized traffic report.

Within scenes that contain the visual representation of the announcer, the facial movements of the announcer are coordinated and/or synchronized with the audio narrative so that the announcer appears to be speaking the narrative. Further, the visual portion and audio portions are matched so that when the audio narrative describes a particular portion of the route, the visual representation of the announcer may gesture toward that particular portion of the route being described.

The visual representation of the announcer may be present in all the scenes of the traffic report. Alternatively, the visual representation of the announcer need not be present in all the scenes of the traffic report. According to this alternative, the visual representation is present in only some of the scenes of the traffic report. In another alternative, the voice of the announcer may be present in some (or all) scenes of the traffic report without the visual representation of the announcer (i.e., the announcer's narrative is presented as a "voice over").

Once the traffic report is assembled, a data file 420 of the traffic report is formed. The data file may be any suitable format, such as an mpg file. The data file of the traffic report is then sent to the user 118 (Step 430). The data file is sent via the data network 148.

The end user 118 receives the data file of the traffic report on his/her computing platform. The end user 118 plays back the traffic report on his/her computing device. More specifically, the user 118 uses the user interface (e.g., speaker, display) of the computing platform to see and hear the personalized traffic report.

The data file of the traffic report may be stored for later playback, or alternatively, the data file of the traffic report may be played back immediately. If the data file is stored, it may be played back several times, in whole or in part.

The traffic report may be played back on the same computing device on which it was received from the traffic data services provider or alternatively the user may transfer the data file of the traffic report to another computing device for playback.

In this embodiment, the traffic report includes a time stamp or expiration time so that a file management application in the user's computing device can delete the data file automatically. Traffic information becomes stale relatively quickly. So it may be preferable to delete old traffic report files, or to replace old traffic report files when new ones are available.

EXAMPLES

Figure 4:
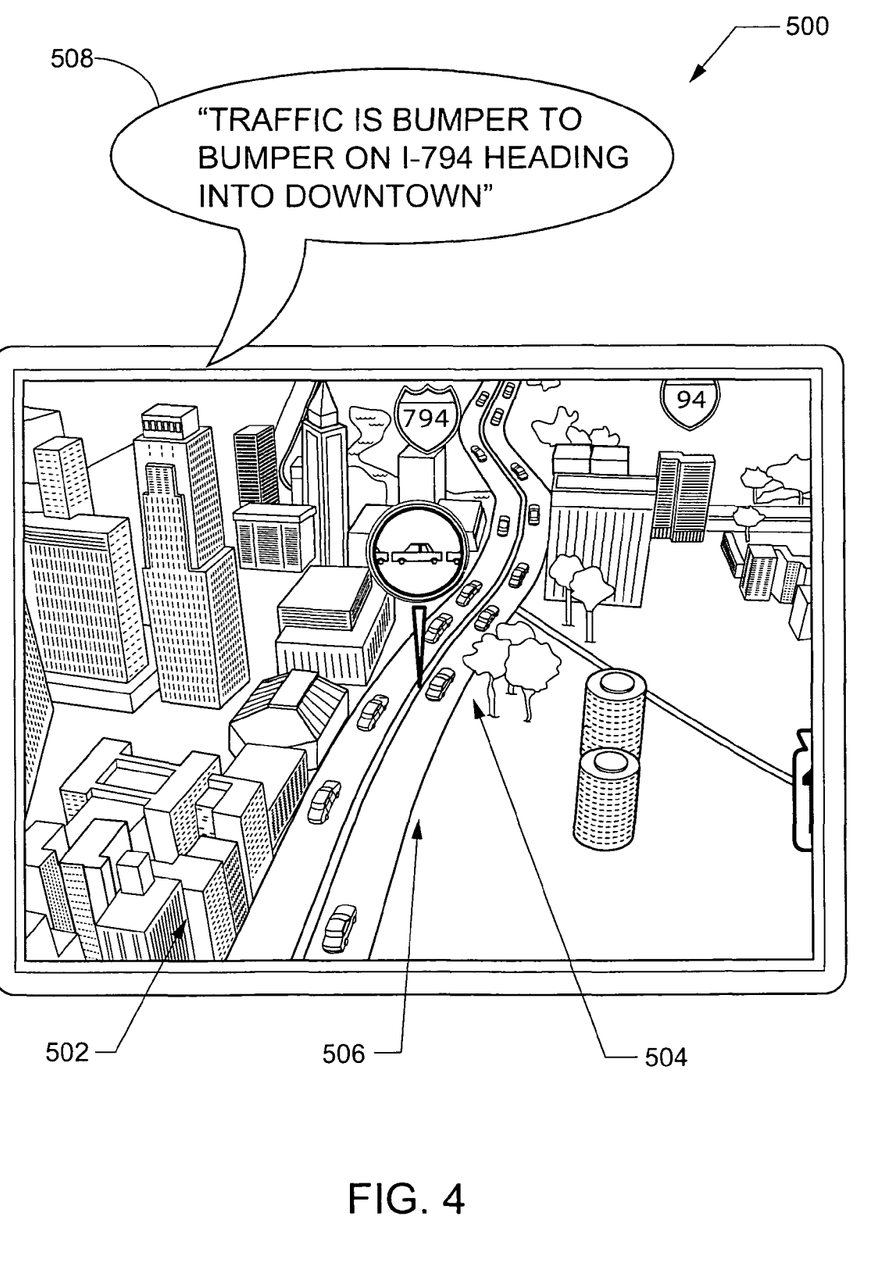
FIGS. 4-6 illustrate scenes from a personalized traffic report formed by the process of FIGS. 3A and 3B.

FIG. 4 shows an example of a display screen 500 of an end user's computing device, such as a mobile phone. On the display screen is a scene 502 from a personalized traffic report formed by the process of FIGS. 3A and 3B. The scene 502 shows an animation 504 of traffic conditions along a users' route 506. The scene is synchronized with an audio narrative composed of audio clips. The audio narrative is presented during display of the scene 502 on the end user's computing device. The audio narrative is presented as a "voice over," i.e., without the announcer being visually present in the scene. In FIG. 4, the audio narrative includes a description 508 of the traffic conditions being displayed.

Figure 5:
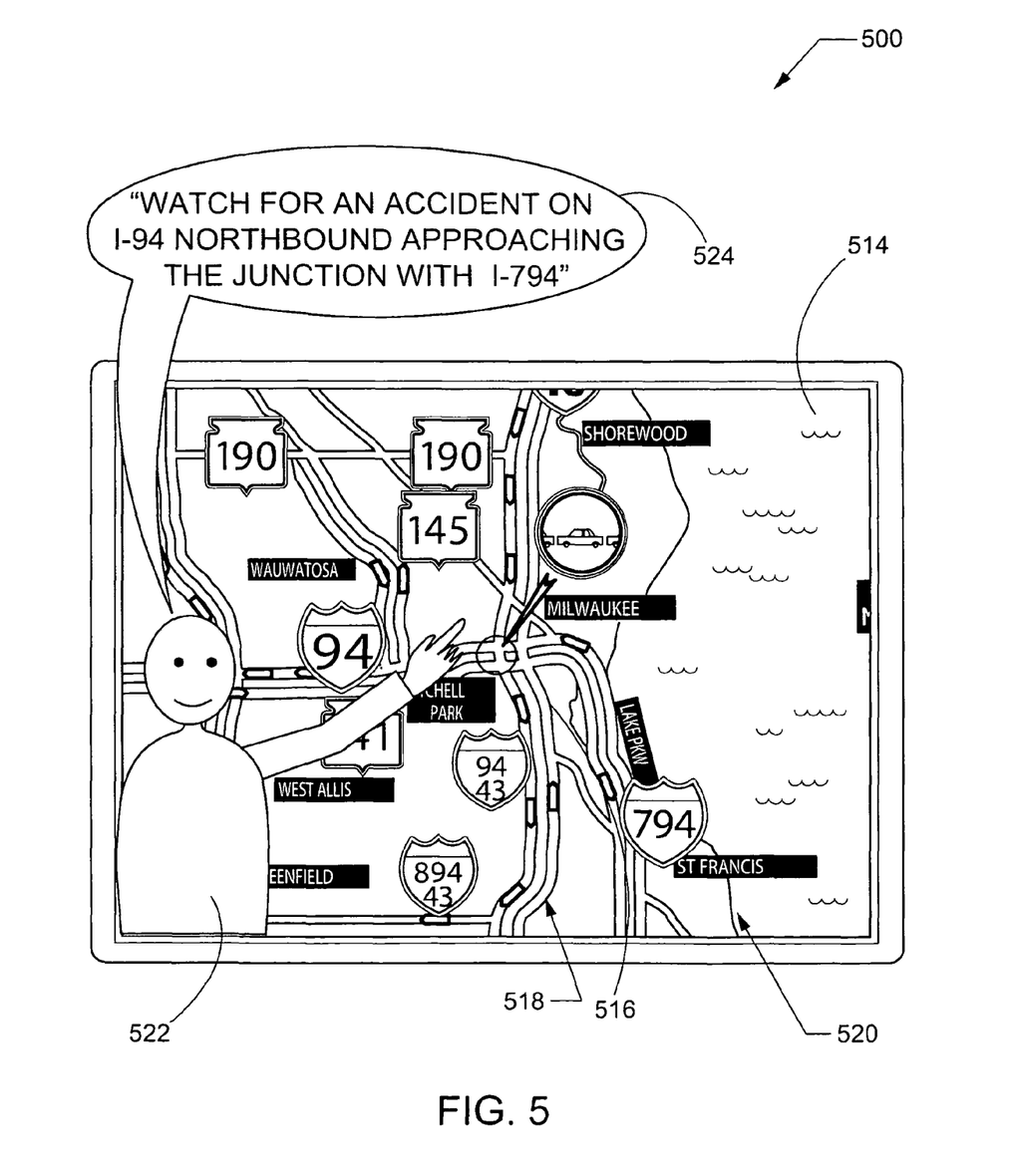

FIG. 5 shows another example of a scene 514 from a personalized traffic report formed by the process of FIGS. 3A and 3B. The scene 514 is being shown on the display screen 500 of the end user's computing device. The scene 514 shows an animation 516 of traffic conditions along a users' route 518. The user's route 518 is shown on a 2D map 520 of the area along the route 518. The scene is synchronized with an audio narrative presented during display of the scene 514 on the end user's computing device. The audio narrative is synchronized with an animated representation 522 of the announcer visually overlaid over the 2D map 520. In FIG. 5, the audio narrative includes a description 524 of the traffic conditions being displayed.

Figure 6:
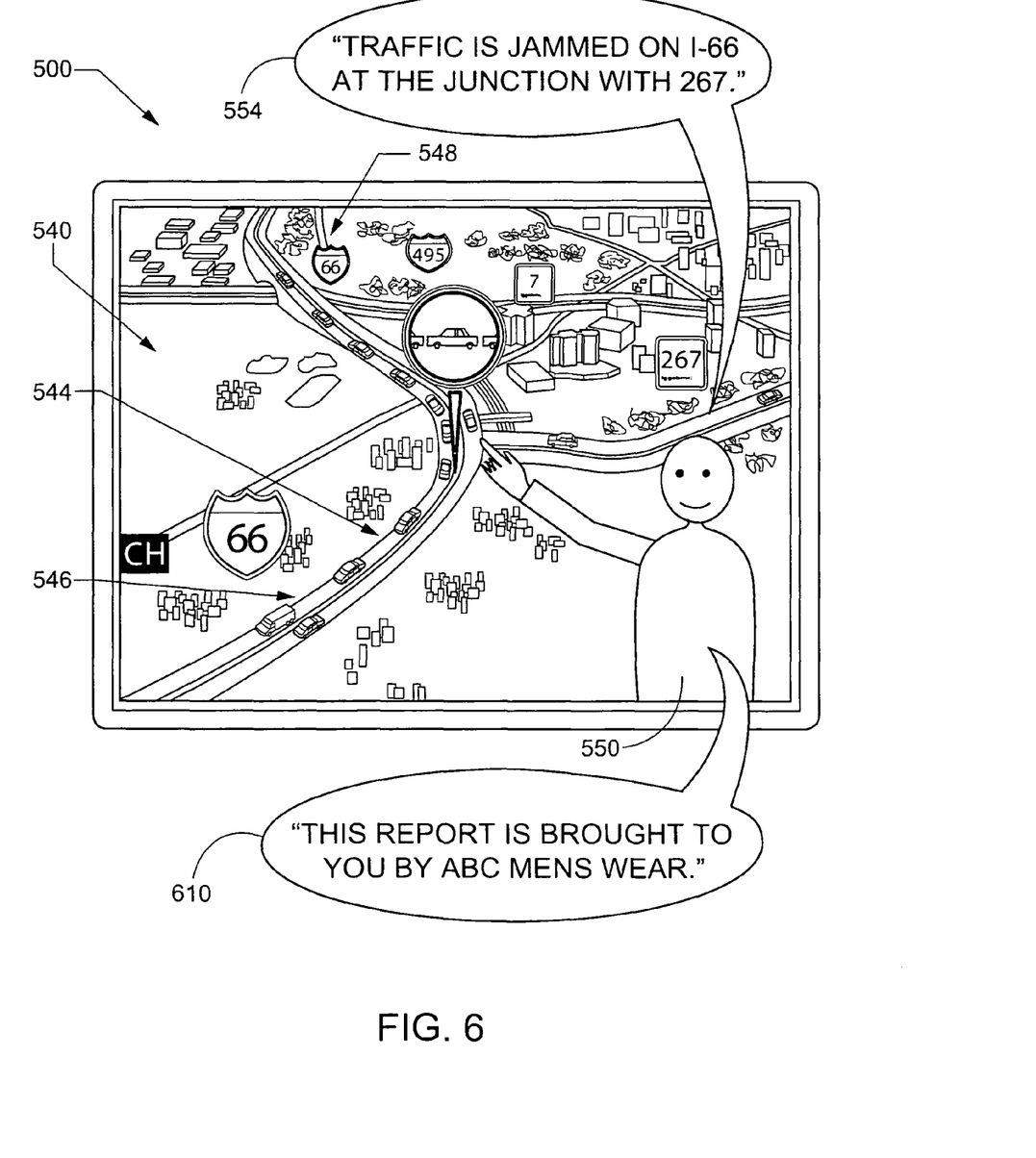

FIG. 6 shows another example of a scene 540 from a personalized traffic report formed by the process of FIGS. 3A and 3B. The scene 540 shows another animation 544 of traffic conditions along a user's route 546. The user's route 546 is shown on a 3D map 548 of the area along the route 546. The scene is synchronized with an audio narrative presented during display of the scene 540. The audio narrative is synchronized with an animated representation 550 of the announcer visually overlaid over the 3D map 548. In FIG. 5, the audio narrative includes a description 554 of the traffic conditions being displayed.

Alternatives

In the embodiments described above, it was explained that the announcer may be a professional announcer or a television or radio announcer. In alternative embodiments, the announcer can be some one else, including fictitious, imaginary, non-living people. For example, the announce may be an avatar. Alternatively, the announcer may be a cartoon character. According to yet another alternative, a user may record his/her own audio clips so that the announcer may be the user himself/herself, or a person known to the user.

In describing the process for forming a personalized traffic report, the steps of obtaining traffic information, map data, audio clips, etc., were described in a certain sequence. The process is not limited to performing these steps in any particular order and these steps may be performed in a different order consistent with the teachings of this disclosure.

In the above embodiments, pre-recorded audio clips were described as being used for creating the audio portion of the personalized traffic report. According to another alternative, text-to-speech processing software may be used to create some or all of the audio portion of the personalized traffic report. The text indicating the names of streets or highways may be obtained from the map database (250 in FIG. 1) and used in the personalized traffic report. In addition, text from dictionaries or other sources may be used for other words in the personalized traffic reports, such as words for traffic conditions, locations, and so on.

It was stated above that a personalized traffic report describes the traffic conditions along a user-selected route, between an origin and a destination. It should be understood that the report does not necessarily include traffic conditions for all portions of the entire route. For example, some routes may contain roads (e.g., relatively minor roads) for which traffic information is not available. In such cases, the personalized traffic report may contain information about the traffic conditions for only part of the route.

Personalized traffic reports may be provided to users on a subscription basis. Alternatively, personalized traffic reports may be provided with advertising. The advertising may consist of a short audio and/or visual commercial. The commercial may precede, follow, or occur during the personalized traffic report. Other kinds of advertising may be provided, including banner ads that are shown during scenes of the report. Product placement advertising may also be presented. The kind of advertising, as well as the timing of the advertising, may be determined by the report template (362 in FIG. 3A). Alternatively, the advertising may be provided separately from the report template. Referring again to FIG. 1, the content of the advertising (i.e., which ad to present) may be determined by an advertising application 600 that operates with the traffic report generator 190. The advertising application 600 uses information about the user (obtained from the user profile database 270) along with information about the user's route (obtained from the user routes database 260) to select advertising that is pertinent to the particular user and his/her location. For example, if the user is a male, the advertising application 600 may select an ad about a sale for men's clothing at a store located along the user's route. Referring again to FIG. 6, an advertising announcement 610 is presented during the traffic report.

It is intended that the foregoing detailed description be regarded as illustrative rather than limiting and that it is understood that the following claims including all equivalents are intended to define the scope of the invention.

I claim:

1. A method for making a personalized traffic report for a user comprising the steps of:
   obtaining current traffic information that pertains to at least one route along roads of a road network in a geographic area from the user's starting location to a destination;
   selecting a plurality of phrases in a voice of an announcer to form an audio track narrative that describes the current traffic information pertaining to the at least one route from the user's starting location to the destination;
   forming an audio-video file that combines (i) the audio track narrative, (ii) a graphical visual representation of at least a portion of the roads of the route, (iii) a visual representation of the current traffic information along the roads of the route and (iv) a visual representation of the announcer speaking at least a portion of the audio track narrative; and
   providing the audio-video file to the user for playback on a computer platform device.

2. The method of claim 1 wherein the visual representation of the announcer is animated to appear to be speaking the audio track narrative.

3. The method of claim 1 wherein the plurality of phrases in the voice of the announcer are pre-recorded.

4. The method of claim 1 wherein the user stores a profile indicating times at which personalized traffic reports are to be automatically transmitted.

5. The method of claim 1 wherein the user stores a profile indicating a selection of the announcer whose voice and visual representation are used in personalized traffic reports.

6. The method of claim 1 wherein the visual representation of the current traffic information along the roads of the route is provided by an animation that moves at a speed that corresponds relatively to that of the traffic along the roads.

7. The method of claim 1 wherein the personalized traffic report has a duration of between 15 seconds and 1 minute.

8. The method of claim 1 wherein the graphical visual representation of the roads of the route includes a scene in which the roads are presented in a 3D view.

9. The method of claim 1 wherein the graphical visual representation of the roads of the route includes a scene in which the roads are presented in a 2D view.

10. The method of claim 1 wherein the graphical visual representation of the roads of the route includes a scene in which the roads are presented in a fly-through video.

11. The method of claim 1 wherein the graphical visual representation of the roads of the route includes a scene in which the roads are presented in a drive-through video.

12. The method of claim 1 wherein the user stores a profile indicating an email address or telephone number to which to send personalized traffic reports.

13. The method of claim 1 wherein the visual representation of the current traffic information along the roads of the route includes incident data.

14. The method of claim 1 wherein the visual representation of the current traffic information along the roads of the route include flow data.

15. The method of claim 1 further comprising:
    obtaining map data from a map database to render the graphical visual representation of the roads of the route.

16. The method of claim 1 further comprising:
    using a report template that defines scenes to depict the graphical visual representation of the roads of the route.

17. The method of claim 1 wherein the visual representation of the announcer includes hand or arm gestures.

18. The method of claim 1 wherein the visual representation of the announcer includes a hand gesture that points to a portion of the route the traffic information about which is described by the audio track narrative.

19. The method of claim 1 wherein the graphical visual representation of the roads of the route, the visual representation of the current traffic information along the roads of the route, the visual representation of the announcer and the audio track narrative are synchronized so that the graphical visual representation of the roads of the route, the visual representation of the current traffic information along the roads of the route and the visual representation of the announcer show the traffic information that is concurrently being described by the audio track narrative.

20. The method of claim 1 wherein the visual representation of the announcer is overlaid over the graphical visual representation of the roads of the route.

21. The method of claim 1 further comprising:
    providing advertising with the personalized traffic report.

22. The method of claim 1 wherein the plurality of phrases in the voice of the announcer are formed by text-to-speech processing.

23. A system for providing personalized traffic reports to users located throughout a geographic area comprising:
 a traffic report generator application operable to form personalized traffic reports and deliver the personalized traffic reports to users, where each personalized traffic report comprises an audio-visual file that includes
 (i) an audio narrative in a voice of an announcer describing traffic conditions along a route between locations specified by a user,
 (ii) one or more visual scenes depicting a graphical map representation of the route including a representation of current traffic information along the route, and
 (iii) a visual representation of the announcer speaking at least a portion of the audio narrative.

24. The system of claim 23 further comprising:
 a navigation services application operable to determine the routes between locations in the geographic area specified by users.

25. The system of claim 23 further comprising:
 a traffic services application operable to maintain information on the current traffic conditions along roads in the geographic area, including routes between locations specified by users.

26. The system of claim 23 further comprising:
 an advertising application operable to include ads with the personalized traffic reports.

27. The system of claim 23 further comprising:
 a collection of audio clips in the voice of the announcer, from which said traffic report generator selects certain audio clips to form the audio narrative of the personalized traffic report.

28. The system of claim 23 further comprising:
 a collection of video clips of the announcer, from which said traffic report generator selects certain video clips to form the visual representation of the announcer.

29. The system of claim 23 further comprising:
 a user profile database that stores information indicating times of day to deliver personalized traffic reports to users.

30. A method for delivering personalized traffic reports to users from an on-line service, comprising the steps of:
 combining phrases to form an audio narrative in a voice of an announcer, wherein the audio narrative describes traffic conditions on a route between locations selected by a user;
 synchronizing the audio narrative with video scenes that show a graphical depiction of the route, the traffic conditions on the route and a visual representation of the announcer speaking at least a portion of the audio narrative; and
 providing an audio-video file of said audio narrative and video scenes to the user for playback.

* * * * *